(12) United States Patent
Sunaga et al.

(10) Patent No.: US 11,829,719 B2
(45) Date of Patent: Nov. 28, 2023

(54) DATA PROCESSING DEVICE, DATA PROCESSING METHOD, AND DATA PROCESSING PROGRAM

(71) Applicant: Nippon Telegraph and Telephone Corporation, Tokyo (JP)

(72) Inventors: Satoshi Sunaga, Tokyo (JP); Koji Hoshino, Tokyo (JP); Kazuhiro Kikuma, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 286 days.

(21) Appl. No.: 17/284,225

(22) PCT Filed: Sep. 19, 2019

(86) PCT No.: PCT/JP2019/036770
§ 371 (c)(1),
(2) Date: Apr. 9, 2021

(87) PCT Pub. No.: WO2020/080031
PCT Pub. Date: Apr. 23, 2020

(65) Prior Publication Data
US 2021/0342537 A1    Nov. 4, 2021

(30) Foreign Application Priority Data

Oct. 17, 2018   (JP) ................................. 2018-196164

(51) Int. Cl.
*G06F 40/279*    (2020.01)
*G06F 16/35*     (2019.01)

(52) U.S. Cl.
CPC ............ *G06F 40/279* (2020.01); *G06F 16/35* (2019.01)

(58) Field of Classification Search
CPC ...... G06F 40/279; G06F 16/35; G06F 40/284; G06F 40/211; G06F 40/216
USPC ............................................................ 704/9
See application file for complete search history.

(56) References Cited

U.S. PATENT DOCUMENTS

| | | | |
|---|---|---|---|
| 2005/0160360 A1* | 7/2005 | Nadamoto | G06F 16/954 715/264 |
| 2012/0239654 A1 | 9/2012 | Tateishi et al. | |
| 2018/0293377 A1* | 10/2018 | Tomonaga | G06F 21/552 |

FOREIGN PATENT DOCUMENTS

| | | |
|---|---|---|
| JP | H09128402 | 5/1997 |
| JP | H09297766 | 11/1997 |
| JP | 2005-202766 | 7/2005 |
| WO | WO 2011/068178 | 6/2011 |

* cited by examiner

*Primary Examiner* — Thierry L Pham
(74) *Attorney, Agent, or Firm* — Fish & Richardson P.C.

(57) ABSTRACT

A data processing apparatus includes a word selection unit configured to select words corresponding to a part-of-speech type targeted for selection from words disassembled from document data, and a generation unit configured to find, for each of the words selected by the word selection unit, a value obtained by weighting the number of occurrences of each of the words or frequency of occurrences of each of the words according to the part-of-speech type of each of the words to generate a vector with a plurality of the values that are found as values of elements.

6 Claims, 10 Drawing Sheets

| NO. | FUNCTIONAL REQUIREMENT DESCRIPTION | VERIFICATION NECESSITY "IN TERMS OF DATA CHANGE" |
|---|---|---|
| 1 | FOR TRAFFIC COLLECTION ITEM, DATA ON EACH ITEM IS CLEARED AT START OF SERVICE IN NEW SYSTEM, AND REMEDY TARGET CALL IS NOT TAKEN AS COUNT TARGET AND NEW CALL IS TAKEN AS COUNT TARGET | NECESSARY |
| 2 | BECAUSE THERE IS PROBABILITY THAT DATA ENTERED INTO DB AND DATA LOADED ON MEMORY ARE UNMATCHED WITH EACH OTHER, RECOVERY PROCEDURE IS PERFORMED IN CASE WHERE MAINTENANCE COMMAND FOR TARGET ITEM IS ENTERED | NECESSARY |
| 3 | REMEDY DETERMINATION PROCESSING PERFORMED BY SINGLE PROCESS IS DISTRIBUTED BY TWO PROCESSES TO SHORTEN REMEDY PROCESSING TIME IN SYSTEM SWITCHING. REMEDY DETERMINATION PROCESSING ITEM IS NOT PARTICULARLY CHANGED | UNNECESSARY |
| 4 | ... | ... |

Fig. 7

| 252 | | NOUN WORD (ALONE, COMPOUND WORD) | | | VERB WORD | | | ADVERB WORD | | AUXILIARY VERB WORD | |
|---|---|---|---|---|---|---|---|---|---|---|---|
| | | BoW VECTORIZATION TARGET WORD AND NUMBER OF OCCURRENCES THEREOF | | | | | | | | | |
| NO. | FUNCTIONAL REQUIREMENT DESCRIPTION | TRAFFIC (WORD 1) | COLLECTION (WORD 2) | ITEMS (WORD 3) | ... | SHI (WORD m) | SE (WORD m+1) | ... | ESPECIALLY (WORD n) | ... | ... |
| 1 | TRAFFIC... | 1 | 1 | 2 | ... | 1 | 1 | ... | 0 | ... | ... |
| 2 | ENTERED INTO DB... | 0 | 0 | 1 | ... | 1 | 0 | ... | 0 | ... | ... |
| 3 | IN TARGET PROCESS... | 0 | 0 | 1 | ... | 1 | 0 | ... | 1 | ... | ... |
| 4 | ... | ... | ... | ... | ... | ... | ... | ... | ... | ... | ... |

Fig. 8 a) NOUN (ALONE)
b) NOUN (ALONE) + NOUN (COMPOUND WORD)
c) NOUN (ALONE) + NOUN (COMPOUND WORD) + VERB
d) NOUN (ALONE) + NOUN (COMPOUND WORD) + VERB + ADJECTIVE + ADVERB
e) NOUN (ALONE) + NOUN (COMPOUND WORD) + VERB
   + ADJECTIVE + ADVERB + PARTICLE + AUXILIARY VERB
...

DATA PROCESSING DEVICE, DATA PROCESSING METHOD, AND DATA PROCESSING PROGRAM

CROSS-REFERENCE TO RELATED APPLICATIONS

This application is a National Stage application under 35 U.S.C. § 371 of International Application No. PCT/JP2019/036770, having an International Filing Date of Sep. 19, 2019, which claims priority to Japanese Application Serial No. 2018-196164, filed on Oct. 17, 2018. The disclosure of the prior application is considered part of the disclosure of this application, and is incorporated in its entirety into this application.

TECHNICAL FIELD

The present invention relates to a data processing apparatus, a data processing method, and a data processing program.

BACKGROUND ART

There are methods for classifying documents by making linguistic expression of a text or a word mathematically-manageable. For example, there has been proposed a method for calculating the similarity of document data in which content and subject of information are reflected and a method for assigning a similarity, based on an evaluation value, to each of a plurality of reference documents according to an input document (see Patent Literature 1, 2).

There has been also proposed a bag-of-words (BoW) method for expressing document data by a vector. In this case, by expressing the document data by the vector, a similarity between documents can be measured by a similarity between vectors.

CITATION LIST

Patent Literature

Patent Literature 1: JP 09-128402 A
Patent Literature 2: JP 09-297766 A

SUMMARY OF THE INVENTION

Technical Problem

In the BoW method, all of appearing words are not used as features (vector elements), but in many cases, vectorization is performed after words not useful in obtaining document data characteristics have been deleted as stop words. The stop words include, for example, "the", "a", "is", "have", "take", "ha", "no", "desu", "masu", and the like. In the BoW method, such a selection of stop words or a dictionary of stop words is required.

In light of the foregoing, an object of the present invention is to provide a data processing apparatus, a data processing method, and a data processing program configured such that neither the selection of stop words nor the dictionary of stop words is required in expression of a document by a vector.

Means for Solving the Problem

For solving the above-described problem and accomplishing the object, the data processing apparatus according to the present invention includes a selection unit configured to select words corresponding to a part-of-speech type targeted for selection from words disassembled from document data, and a generation unit configured to find, for each of the words selected by the selection unit, a value obtained by weighting the number of occurrences of each of the words or frequency of occurrences of each of the words according to the part-of-speech type of each of the words to generate a vector with a plurality of the values that are found as values of elements.

The data processing apparatus according to the present invention includes a learning unit configured to select first words corresponding to a part-of-speech type targeted for selection from words disassembled from training data, find, for each of the first words that are selected, a first value obtained by weighting the number of occurrences of each of the first words or frequency of occurrences of each of the first words according to the part-of-speech type of each of the first words to generate a first vector with a plurality of the first values that are found as values of elements, and learn the first vector that is generated and information relating to a necessity of verification associated with the training data, and a prediction unit configured to select second words corresponding to the part-of-speech type targeted for selection from words disassembled from data targeted for prediction, find, for each of the second words that are selected, a second value obtained by weighting the number of occurrences of each of the second words or frequency of occurrences of each of the second words according to the part-of-speech type of each of the second words to generate a second vector with a plurality of the second values that are found as values of elements, and predict a necessity of verification on the data targeted for prediction based on the second vector that is generated and a learning result from the learning unit.

Effects of the Invention

According to the present invention, neither a selection of stop words nor a dictionary of stop words is necessary in expression of the document by the vector.

DESCRIPTION OF EMBODIMENTS

Hereinafter, embodiments of the present invention will be described in detail with reference to the drawings. Note that the present invention is not limited by the embodiments. In the description of the drawings, the identical parts are denoted by the same reference signs.

First Embodiment

A first embodiment of the present invention will be described. In the first embodiment of the present invention, it is assumed that electronic text document data (hereinafter referred to as "document data") is a target. Of words obtained by disassembling using morphological analysis or the like, a word corresponding to a part-of-speech type targeted for selection is selected from the document data in the first embodiment. Next, in the first embodiment, for each selected word, a value obtained by weighting the number of occurrences of the word or frequency of occurrences of the word according to the part-of-speech type of the word is found. Then, in the first embodiment, a BoW vector with each found value as a value of each element is generated, and thus, neither a selection of stop words nor a dictionary of stop words is necessary.

Configuration of Data Processing Apparatus

Figure 1:
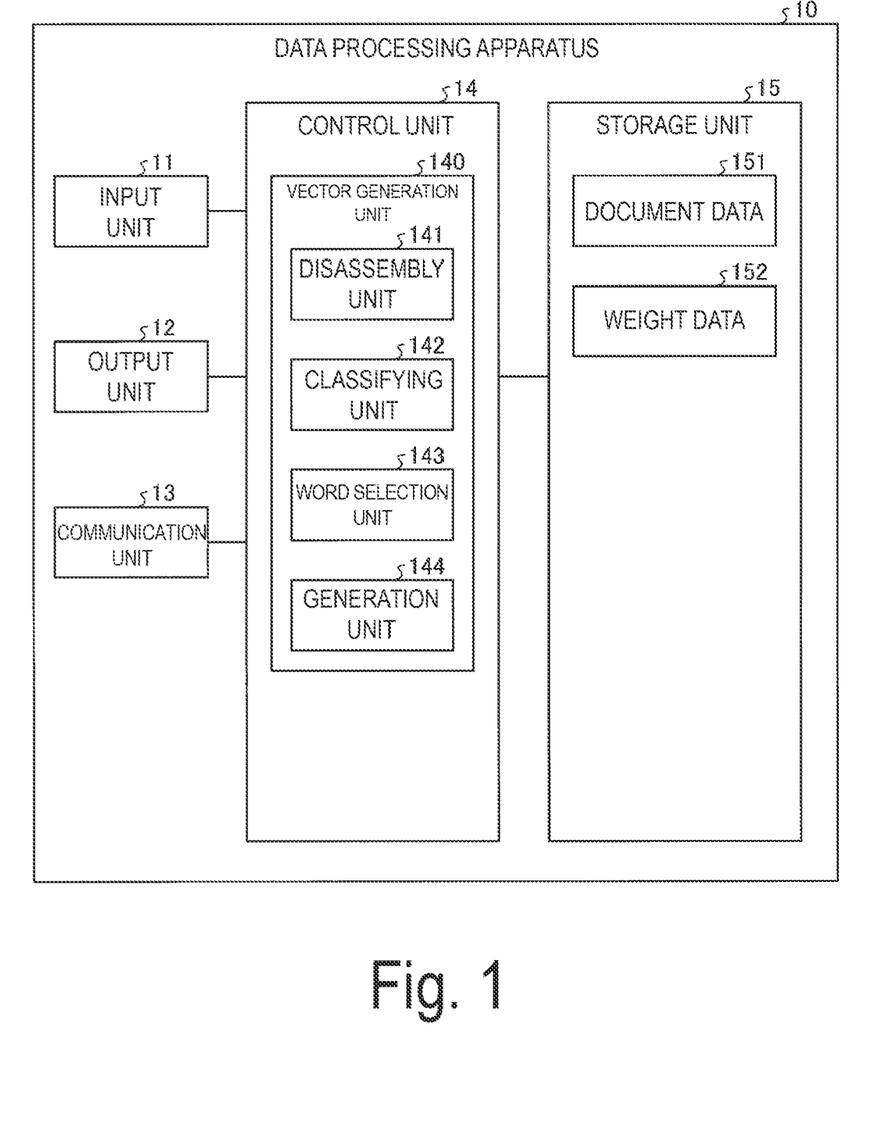
FIG. 1 is a diagram schematically illustrating an example of a configuration of a data processing apparatus according to a first embodiment.

First, a configuration of a data processing apparatus according to the first embodiment will be described. FIG. 1 is a diagram schematically illustrating an example of the configuration of the data processing apparatus according to the first embodiment. As illustrated in FIG. 1, the data processing apparatus 10 includes an input unit 11, an output unit 12, a communication unit 13, a control unit 14, and a storage unit 15.

The input unit 11 is an input interface configured to accept various types of operation from an operator of the data processing apparatus 10. For example, the input unit 11 includes an input device such as a touch panel, a voice input device, a keyboard, or a mouse.

The communication unit 13 is a communication interface configured to transmit and receive various pieces of information to and from other apparatuses connected via a network or the like. The communication unit 13 is implemented by a network interface card (NIC) or the like, and performs communication between another apparatus and the control unit 14 (which will be described below) via an electrical communication line such as a local area network (LAN) or the Internet. For example, the communication unit 13 receives data of a document file targeted for BoW vector generation via the network, and outputs the data to the control unit 14. The communication unit 13 outputs, to an external apparatus, information on the BoW vector generated by the control unit 14 via the network.

The output unit 12 is, for example, implemented by a display apparatus such as a liquid crystal display, a printing apparatus such as a printer, and an information communication apparatus, and outputs information and the like indicating the target word and the BoW vector generated by the control unit 14.

The control unit 14 controls the entire data processing apparatus 10. The control unit 14 is, for example, an electronic circuit such as a central processing unit (CPU) or a micro processing unit (MPU), or an integrated circuit such as an application specific integrated circuit (ASIC) or a field programmable gate array (FPGA). The control unit 14 includes an internal memory configured to store programs defining various processing procedures and control data, and executes each type of processing by using the internal memory. The control unit 14 functions as various processing units by running various programs.

The control unit 14 includes a vector generation unit 140 configured to generate the BoW vector for the document data targeted for processing. The vector generation unit 140 includes a disassembly unit 141, a classifying unit 142, a word selection unit 143 (a selection unit), and a generation unit 144.

The disassembly unit 141 disassembles the document data into each word by using a morphological analysis tool such as MeCab, for example. At this point, the disassembly unit 141 also holds part-of-speech information on each word.

The classifying unit 142 sorts each word, and then, deletes overlapping words. Subsequently, the classifying unit 142 sorts and classifies the words according to part-of-speech.

The word selection unit 143 selects words targeted for BOW vectorization by part-of-speech designation. In other words, the word selection unit 143 selects the word corresponding to the part-of-speech type targeted for selection from the words having been disassembled from the document data. The word selection unit 143 selects the words corresponding to plural part-of-speech types. Note that a noun alone and a noun compound word as a combination of a plurality of nouns are taken as different part-of-speech types. The word selection unit 143 finds the number of occurrences for the selected words, and associates such a number with each word. The word selection unit 143 sorts the words in order of the number of occurrences. Note that the word selection unit 143 may find the frequency of occurrences for the selected words, and sort each word in order of the frequency of occurrences. The frequency of occurrences indicates, for example, a percentage with respect to a total word number included in the document data.

The generation unit 144 finds, for each word selected by the word selection unit 143, the value obtained by weighting the number of occurrences of the word according to the part-of-speech type of the word, and generates the BoW vector with each found value as the value of each element. For example, the generation unit 144 finds a part-of-speech weight with reference to weight data 152 of the storage unit 15. Then, for each word selected by the word selection unit 143, the generation unit 144 finds a value by multiplying by the weight corresponding to each part-of-speech type, and generates the BoW vector by using each found value as the value of each element. Note that the generation unit 144 may generate, for each word selected by the word selection unit 143, the BoW vector with, as the value of each element, each value obtained by weighting the frequency of occurrences of the word according to the part-of-speech type of the word.

The storage unit 15 is a storage apparatus such as a hard disk drive (HDD), a solid state drive (SSD), or an optical disc. Note that the storage unit 15 may be a data-rewritable semiconductor memory such as a random access memory (RAM), a flash memory, or a non-volatile static random access memory (NVSRAM). The storage unit 15 stores an operating system (OS) or various programs to be executed in the data processing apparatus 10. Further, the storage unit 15 stores various types of information used in execution of the programs. The storage unit 15 stores document data 151 and the weight data 152.

The document data 151 is electronic text document data, and includes a document file targeted for processing by the data processing apparatus 10. The weight data 152 is data that indicating, for each part-of-speech, the number of occurrences of each word or the weight to multiply the number of occurrences of each word in BoW vector generation by the generation unit 144.

Data Processing Flow

Figure 2:
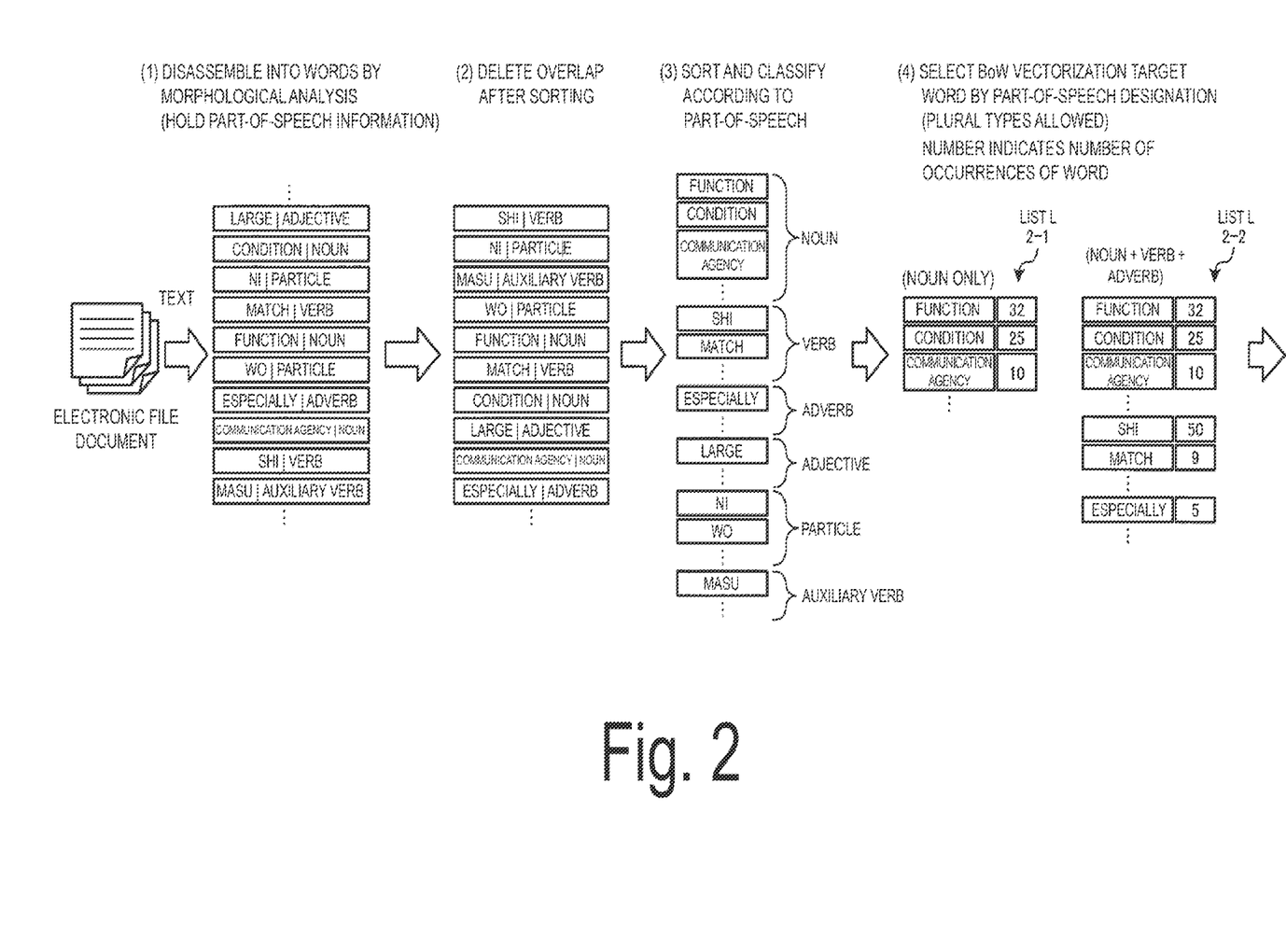
FIG. 2 is a chart for describing a processing flow in the data processing apparatus illustrated in FIG. 1.
Figure 3:
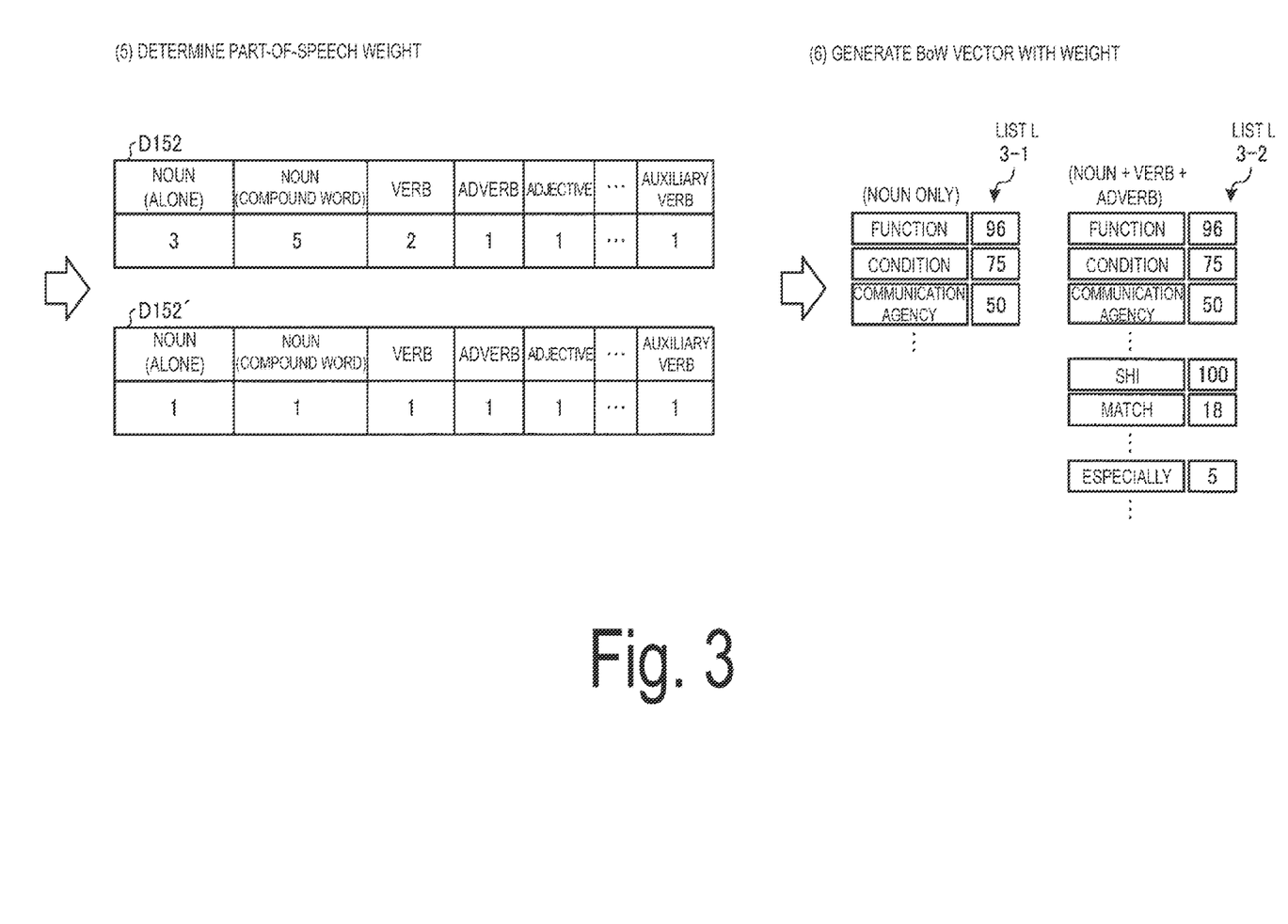
FIG. 3 is a chart for describing the processing flow in the data processing apparatus illustrated in FIG. 1.

Next, a processing flow in the data processing apparatus 10 will be described in detail. FIGS. 2 and 3 are charts for describing the processing flow in the data processing apparatus 10 illustrated in FIG. 1. First, processing until the data processing apparatus 10 selects the word targeted for BoW vectorization will be described with reference to FIG. 2.

As illustrated in FIG. 2, in the data processing apparatus 10, when accepting the input of the document data (group) as a processing target, the disassembly unit 141 classifies, from the document data, the words according to the part-of-speech type by the morphological analysis (see (1) of FIG. 2). Subsequently, the classifying unit 142 sorts the words classified by the disassembly unit 141, and then, deletes the overlapping words (see (2) of FIG. 2). Then, the classifying unit 142 obtains a list as the basis for the words targeted for BOW vectorization, in which the words are sorted and arranged according to part-of-speech (see (3) of FIG. 2).

The word selection unit 143 designates, from the list obtained by the classifying unit 142, the part-of-speech of the word targeted for BoW vectorization to select the word targeted for BoW vectorization (see (4) of FIG. 2). In this case, the word selection unit 143 selects the words corresponding to the plural part-of-speech types. The word selection unit 143 finds the number of occurrences for the selected words, and associates such a number with each word. Further, the word selection unit 143 sorts each word in order of the number of occurrences.

The word selection unit 143 may designate, for example, the noun alone as the part-of-speech to obtain a list L2-1 in which only the noun alone words are designated and sorted in order of the number of occurrences. The word selection unit 143 may designate the noun alone, the noun compound word, a verb, and an adverb as the part-of-speech to obtain a list L2-2 in which the words are sorted in order of the number of occurrences. The word selection unit 143 designates the part-of-speech, such as designating only the noun and the verb or designating all words of the part-of-speech other than the words as a particle and an auxiliary verb.

Next, a processing flow until the data processing apparatus 10 generates the BoW vector will be described with reference to FIG. 3. In the data processing apparatus 10, the weight according to the part-of-speech is determined (see (5) of FIG. 3).

Specifically, determination is made such that the weight varies according to the part-of-speech type. For example, the data processing apparatus 10 employs weight data D152 to determine that the weight increases as the part-of-speech has higher usefulness of information indicating document characteristics. In the weight data D152, the noun is a weight of "3" and a compound word is a weight of "5" while the auxiliary verb and the adverb are set to a weight of "1". Note that, since the compound word is a word newly formed by combining two or more words, and many technical terms and industry terms are compound words, the compound word is taken as the part-of-speech useful in indicating the document characteristics independently of the noun (alone) which is a common noun (a general term). In a case where the part-of-speech weight is not used, the data processing apparatus 10 employs weight data D152', and sets all words to the same weight of "1" regardless of the part-of-speech type.

Subsequently, the generation unit 144 finds, for each word selected by the word selection unit 143, the value obtained by multiplying the number of occurrences of the word by the weight corresponding to the part-of-speech type (see (6) of FIG. 3).

For example, for a word "function", the generation unit 144 finds "96" (see the lists L3-1, L3-2) by multiplying the number of occurrences "32" (see the lists L2-1, L2-2) by a weight of "3" for the noun (alone) (see the weight data. D152). For a word "communication agency", the generation unit 144 finds "50" by multiplying the number of occurrences "10" by a light of "5" for the noun (the compound word). The generation unit 144 finds "100" by multiplying the number of occurrences "50" for a word "shi" by a verb weight of "2".

The generation unit 144 generates the BoW vector by using each word value found as described above as the value of each element.

Processing Procedure of Data Processing Method

Figure 4:
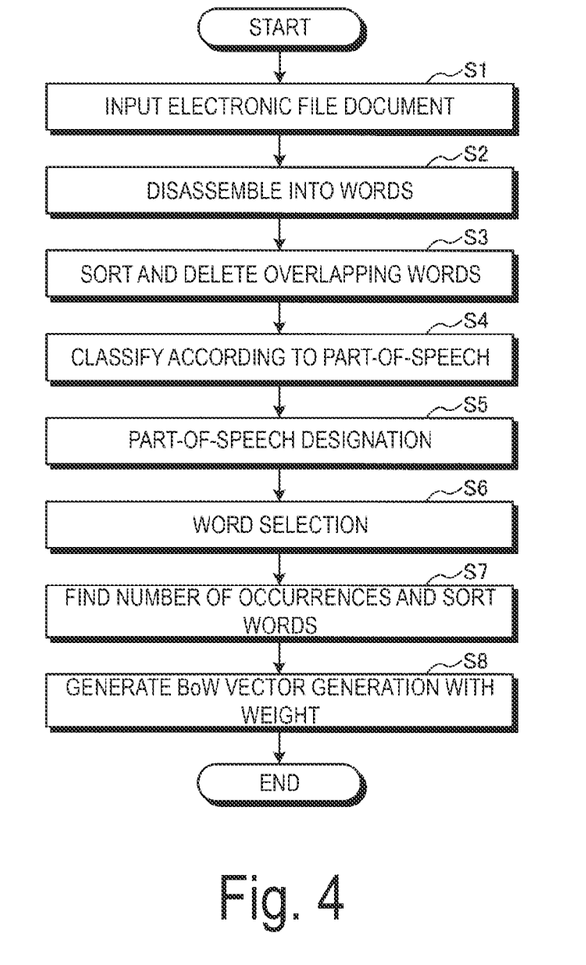
FIG. 4 is a flowchart illustrating a processing procedure of a data processing method according to the embodiment.

Next, a processing procedure of a data processing method by the data processing apparatus 10 illustrated in FIG. 1 will be described with reference to FIG. 4. FIG. 4 is a flowchart illustrating the processing procedure of the data processing method according to the embodiment.

As illustrated in FIG. 4, when the control unit 14 accepts the input of the document data as the processing target (Step S1), the control unit 14 disassembles the document data into each word by using the morphological analysis (Step S2). At this point, the disassembly unit 141 also holds part-of-speech information on each word. Then, the classifying unit 142 sorts each word, and then, deletes the overlapping words (Step S3). Subsequently, the classifying unit 142 sorts and classifies the words according to the part-of-speech (Step S4).

The word selection unit 143 designates the part-of-speech (Step S5) to select the word targeted for BoW vectorization (Step S6). The word selection unit 143 finds the number of occurrences for the selected word, and sorts each word in order of the number of occurrences (Step S7). Note that the word selection unit 143 may find the frequency of occurrences for the selected words, and sort each word in order of the frequency of occurrences.

The generation unit 144 finds, for each word selected by the word selection unit 143, the value obtained by weighting the number of occurrences of the word according to the part-of-speech type of the word to generate the BoW vector with each found value as the value of each element (Step S8), and ends the processing. Note that the generation unit 144 may generate, for each word selected by the word selection unit 143, the BoW vector with, as the value of each element, each value obtained by weighting the frequency of occurrences of the word according to the part-of-speech type of the word.

Effects of Embodiment

Figure 5:
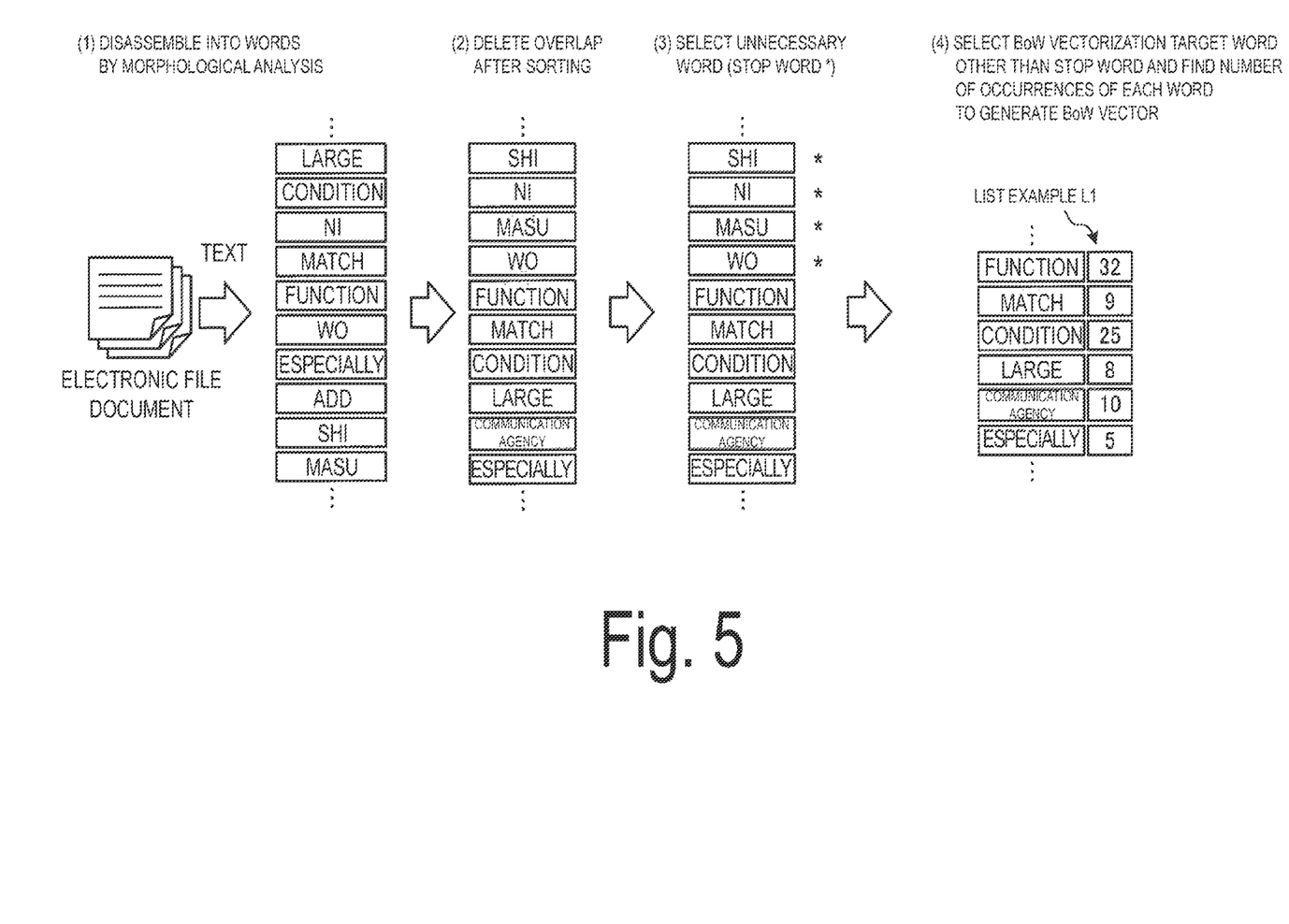
FIG. 5 is a chart illustrating the flow of a related-art BoW vector generation processing.

Related-art BoW vector generation processing will be described herein. FIG. 5 is a chart illustrating the flow of the related-art BoW vector generation processing. In the related-art, words are classified from document data by the morphological analysis (see (1) of FIG. 5) and are sorted, and overlapping words are deleted (see (2) of FIG. 5). Then, in the related-art, an unnecessary word (a stop word (which is a word marked with a star in the figure)) is selected (see (3) of FIG. 5). Then, in the related-art, words targeted for BoW vectorization other than the stop word are selected, the number of occurrences of each word is found (see a list L1), and a BoW vector is generated with the found value as an element value (see (4) of FIG. 5). Thus, in the related-art, a selection of stop words or a dictionary of stop words is necessary.

Conversely, in the data processing apparatus 10 according to the first embodiment, the word corresponding to the part-of-speech type targeted for selection is selected from the words having been disassembled from the document data, the value obtained by weighting the number of occurrences of the word according to the part-of-speech type of the word is found for each selected word, and the BoW vector is generated with each found value as the value of each element. In this manner, in the data processing apparatus 10, when the document is expressed by the vector, the word targeted for BOW vectorization is selected after designation of the part-of-speech type. That is, the data processing apparatus 10 sorts the words useful and the words not useful in indicating the document characteristics according to the part-of-speech, and thus, neither the selection of stop words nor the dictionary of stop words is necessary in BoW vectorization processing.

Further, the data processing apparatus 10 can generate the BoW vector significantly indicating the document characteristics by setting a higher weight as the part-of-speech has higher usefulness in indicating the document characteristics. In the data processing apparatus 10, the word targeted for BoW vectorization can be selected according to a combination of the plural part-of-speech types, and thus, the word targeted for BoW vectorization can be freely changed.

Second Embodiment

Next, a second embodiment will be described. In the second embodiment, an example where the BoW vector generation method according to the first embodiment is applied to a prediction method for determining necessity of verification will be described.

Figure 6:
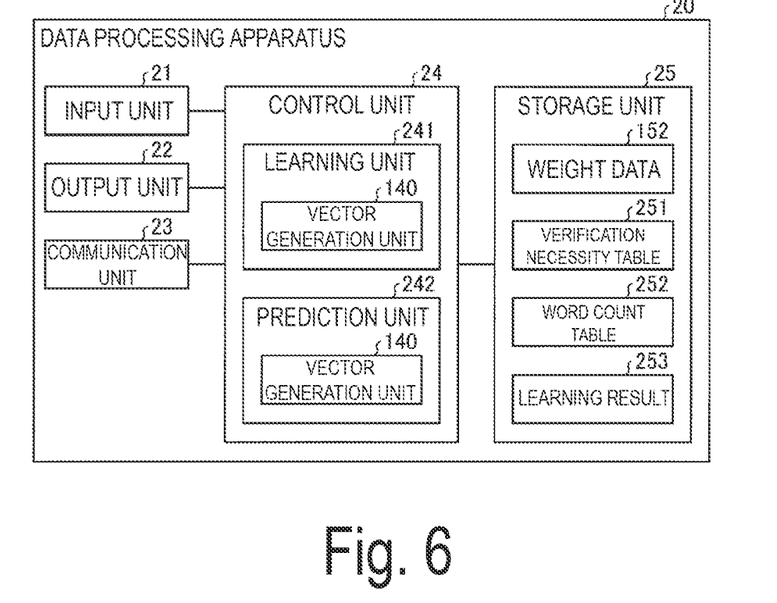
FIG. 6 is a diagram schematically illustrating an example of a configuration of a data processing apparatus according to a second embodiment.

FIG. 6 is a diagram schematically illustrating an example of a configuration of a data processing apparatus according to the second embodiment. As illustrated in FIG. 6, the data processing apparatus 20 includes an input unit 21, an output unit 22, a communication unit 23, a control unit 24, and a storage unit 25.

The input unit 21 includes a function similar to that of the input unit 11 of the data processing apparatus 10. The output unit 22 includes a function similar to that of the output unit 12 of the data processing apparatus 10. The communication unit 23 includes a function similar to that of the communication unit 23 of the data processing apparatus 10.

The control unit 24 includes a function similar to that of the control unit 14 of the data processing apparatus 10. The control unit 24 includes a learning unit 241 and a prediction unit 242 each having vector generation unit 140.

The learning unit 241 generates a BoW vector regarding training data in the vector generation unit 140, and learns the generated BoW vector and information relating to necessity of verification associated with the training data by machine learning. The learning unit 241 stores a learning result 253 in the storage unit 25. Here, the training data is a description (a functional requirement description) relating to requirements of a developed function. Each function described as the training data is associated with the necessity of verification (test) in advance for each function, and the associated data is stored as a verification necessity table 251 (described below) in the storage unit 25.

The prediction unit 242 generates a BoW vector regarding data (the functional requirement description) targeted for prediction, and predicts the necessity of verification on the data targeted for prediction based on the generated BoW vector and the learning result from the learning unit 241.

The storage unit 25 includes a function similar to that of the storage unit 15 of the data processing apparatus 10. The storage unit 25 includes weight data 152, the verification necessity table 251, a word count table 252, and the learning result 253.

Figure 7:
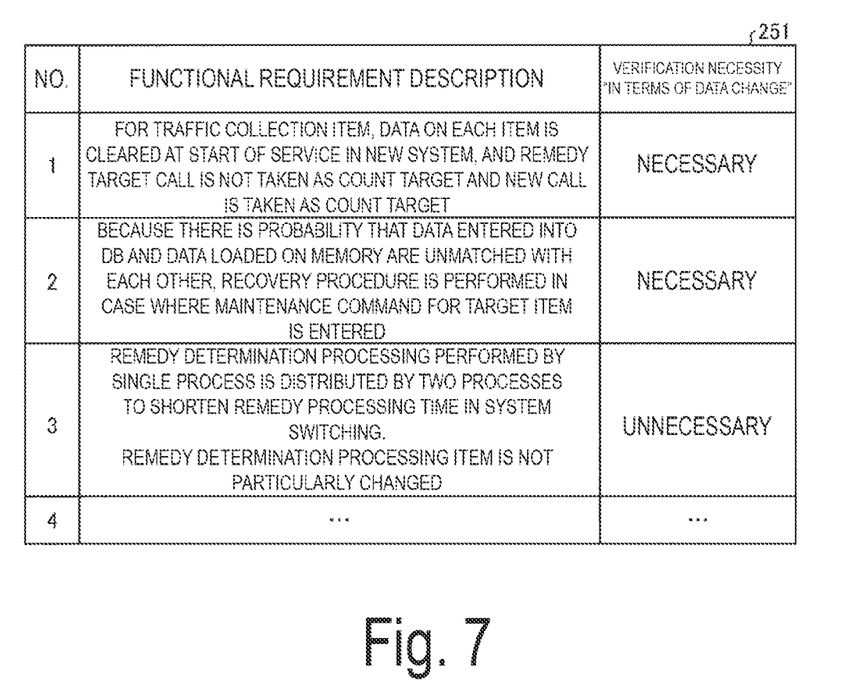
FIG. 7 is a table illustrating an example of a verification necessity table.

The verification necessity table 251 associates the necessity of verification with each description of the requirements of the developed function. FIG. 7 is a table illustrating an example of the verification necessity table 251. As illustrated in FIG. 7, the verification necessity table 251 includes the following items: a serial number (NO.), the functional requirement description (a natural language), and the necessity of verification from a viewpoint of data change indicating that the verification is necessary (NECESSARY) or the verification is not necessary (UNNECESSARY). For example, a serial number "1" describes, as the functional requirement description, that "for a traffic collection item, data on each item is cleared at the start of a service in a new system, and a remedy target call is not taken as a count target and a new call is taken as a count target", and associates such a description with the "NECESSARY (indicating that verification is necessary)".

Figure 8:
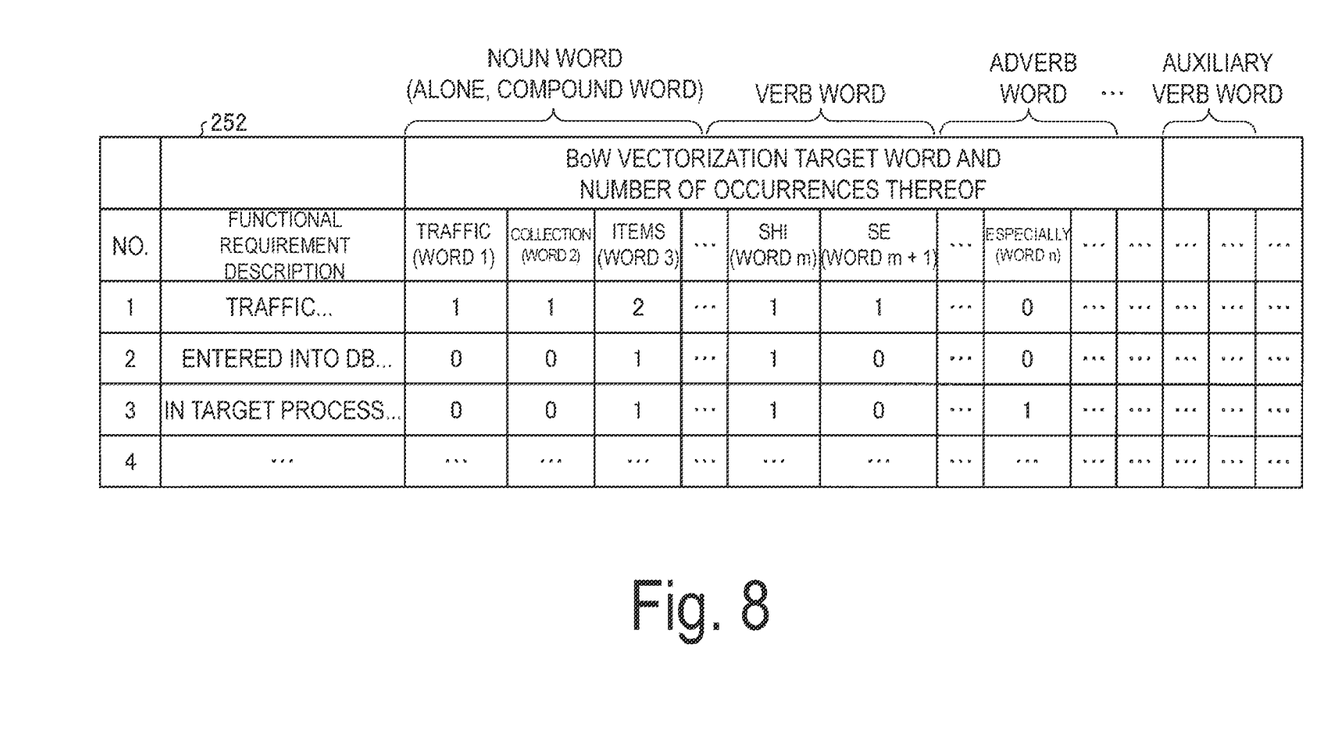
FIG. 8 is a table illustrating an example of a word count table.

The word count table 252 is a count table of the number of occurrences of the word by the vector generation unit 140 FIG. 8 is a table illustrating an example of the word count table 252. The word count table 252 includes the following items: a serial number (NO.), the functional requirement description, and the BoW vectorization target word and the number of occurrences thereof. The learning result 253 is a learning result from the learning unit 241.

Learning Processing Flow

First, learning processing by the data processing apparatus 20 will be described. A case where the learning unit 241 learns data on each serial number of the functional requirement description of the verification necessity table 251 illustrated in FIG. 7 will be described as an example. In this case, the learning unit 241 uses the vector generation unit 140 to BoW-vectorize the functional requirement description of each serial number of the verification necessity table 251.

For example, document data of "for a traffic collection item, data on each item is cleared at the start of a service in a new system, and a remedy target call is not taken as a count target and a new call is taken as a count target" at a serial number "1" will be described. In this case, in the learning unit 241, the vector generation unit 140 disassembles the functional requirement description of the serial number "1" into each word by using a morphological analysis tool such as MeCab, and after having deleted overlapping words, sorts and classifies the words according to part-of-speech.

Subsequently, in the learning unit 241, the vector generation unit 140 counts the number of occurrences of each word corresponding to the serial number "1" to describe the count number in each field of the serial number "1" of the word count table 252 (see FIG. 8). The functional requirement description of the serial number "1" is, for example, associated with the number of occurrences "1" for a noun "traffic", the number of occurrences "1" for a noun "collection", the number of occurrences "1" for a verb "shi", and the like.

Then, in the learning unit 241, the vector generation unit 140 selects the part-of-speech targeted for BOW vectorization. The vector generation unit 140 selects the part-of-speech according to only the single part-of-speech or a combination of plural part-of-speech types to select the word targeted for BoW vectorization.

Figure 9:
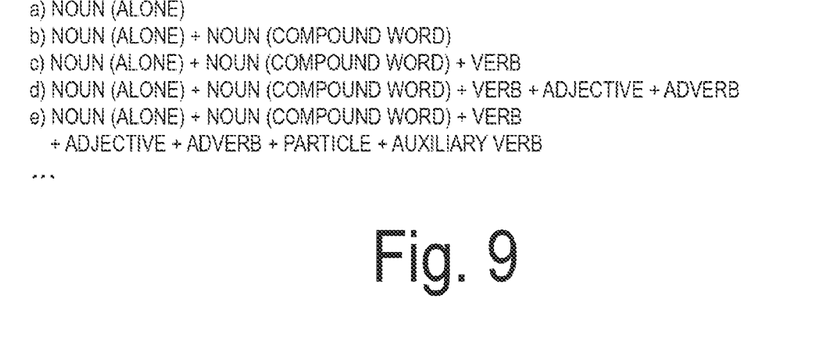
FIG. 9 is a view illustrating an example of a combination of part-of-speech types in part-of-speech selection by a learning unit.

FIG. 9 is a view illustrating an example of the combination of the plural part-of-speech types in part-of-speech selection by the learning unit 241. The learning unit 241 can select only a noun (alone) as illustrated in (a) of FIG. 9, and can also select a combination of the noun (alone), a noun (a compound word), and a verb as illustrated in (c) of FIG. 9. In this manner, the learning unit 241 can select the word targeted for BoW vectorization according to the combination of the plural part-of-speech types, and thus, can freely change the word targeted for BoW vectorization.

Next, in the learning unit 241, the vector generation unit 140 designates the part-of-speech of the word targeted for BoW vectorization by using any of the part-of-speech combinations illustrated in FIG. 9, and in this manner, selects the word targeted for BoW vectorization. Then, in the learning unit 241, the vector generation unit 140 finds, for each word selected by the word selection unit 143, a value obtained by weighting the number of occurrences of the word according to the part-of-speech type of the word, and generates the BoW vector with each found value of each word as a value of each element.

In the learning unit 241, word disassembly and word selection according to the part-of-speech type are performed for each functional requirement description targeted for learning, and, for each word, the value obtained by weighting the number of occurrences of the word according to the part-of-speech type of the word is found and the BoW vector is generated with each found value as the value of each element. Note that the learning unit 241 may generate the BoW vector using the frequency of occurrences of the word rather than the number of occurrences of the word.

Figure 10:
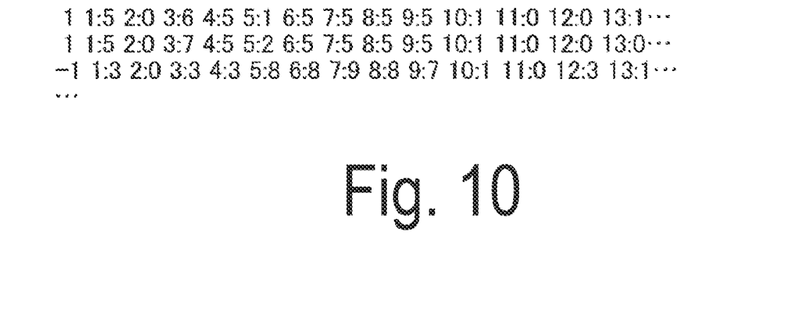
FIG. 10 is a view illustrating an example of a BoW vector generated by the learning unit.

Then, the learning unit 241 associates the BoW vector generated in the vector generation unit 140 with the information regarding the necessity of verification associated with the training data. FIG. 10 is a view illustrating an example of the BoW vector generated by the learning unit 241. The learning unit 241 generates one-row numerical sequence for each item of the functional requirement description, and, as a first numerical value of each row, assigns "1" indicating that verification is necessary (NECESSARY) or "−1" indicating that verification is not necessity (UNNECESSARY) to the beginning of each row. As illustrated in the first row of FIG. 10, the learning unit 241 assigns, for example, "1" indicating that verification is necessary (NECESSARY) to the serial number "1" of the verification necessity table 251 (see FIG. 7).

Subsequently, the learning unit 241 learns each BoW vector illustrated in FIG. 10. Specifically, the learning unit causes a machine learning tool (e.g., liblinear) to learn the BoW vector with the number at the beginning indicating the necessity of verification illustrated in FIG. 10. In the learning unit 241, a result (a trend) learned by the machine learning tool regarding whether a sequence of numerical values for each row other than the first numerical value is classified into the verification necessary "1" or the verification unnecessary "4" of two groups described at the beginning of the sequence is obtained. In other words, the learning unit 241 performs supervised machine learning for causing the machine learning tool to memorize a numerical sequence whose first numerical value is the verification necessary "1" and a numerical sequence whose first numerical value is the verification unnecessary "−1". The learning unit 241 stores such a learning result in the storage unit 25.

Prediction Processing Flow

First, the prediction processing by the data processing apparatus 20 will be described. A case where the data on each serial number of the functional requirement description of the verification necessity table 251 illustrated in FIG. 7 is learned will be described as an example. The prediction unit 242 uses the obtained machine learning result 253 to determine the necessity of verification (perform prediction).

The prediction unit 242 selects, from the items of the functional requirement description other than the learning target data, one item of the functional requirement description targeted for prediction. This functional requirement description will be referred to as a "prediction verification requirement description 1". Note that the prediction unit 242 may select a plurality of functional requirement descriptions, but selects one item for the sake of simplicity in explanation.

Subsequently, in the prediction unit 242, the vector generation unit 140 performs, for the prediction verification requirement description 1, word disassembly and word selection according to the part-of-speech type. At this point, the prediction unit 242 selects the part-of-speech according to the same type of combination as that in part-of-speech selection by the learning unit 241. Then, for each word, the prediction unit 242 finds the value obtained by weighting the number of occurrences of the word according to the part-of-speech type of the word, and generates the BoW vector with each found value as the value of each element. Note that the prediction unit 242 may generate the BoW vector by using the frequency of occurrences of the word rather than the number of occurrences of the word.

As a result, the prediction unit 242 can find "−1 1:0 2:1 3:2 4:0 5:0 6:8 7:8 8:6 9:5 10:0 11:0 12:0 13:0 . . . " as each element value of the BoW vector of the prediction verification requirement description 1. Here, the first number "−1" of the BoW vector is a temporary value to be replaced with the prediction result later. Then, the prediction unit 242 uses the machine learning tool (e.g., liblinear) to calculate, based on the learning result 253 obtained in the learning processing, whether the BoW vector is close to a vector similarity of the group indicating that the verification is necessary "1" or to a vector similarity of the group indicating that the verification is not necessary "4".

Then, in a case where the result is "1", i.e., in a case where the vector is close to the group indicating that the verification is necessary, the prediction unit 242 predicts that the verification of the prediction verification requirement description 1 is necessary. On the other hand, in a case where the result is "−1", i.e., in a case where the vector is close to the group indicating that the verification is not necessary, the prediction unit 242 predicts that the verification of the prediction verification requirement description 1 is not necessary.

Processing Procedure of Learning Processing

Figure 11:
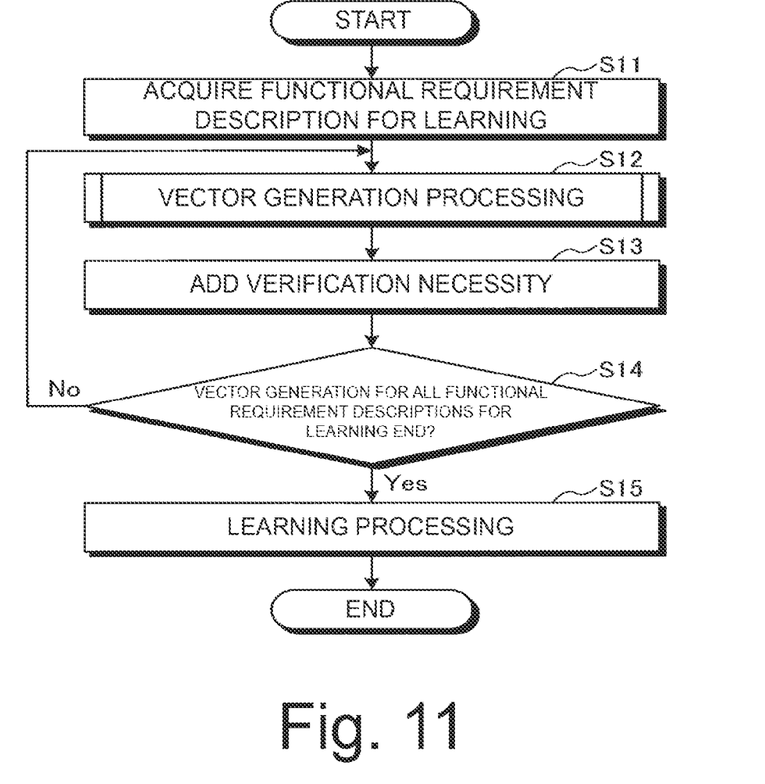
FIG. 11 is a flowchart illustrating a processing procedure of learning processing by the learning unit illustrated in FIG. 6.

Next, the processing procedure of the learning processing by the learning unit 241 will be described, FIG. 11 is a flowchart illustrating the processing procedure of the learning processing by the learning unit 241 illustrated in FIG. 6.

As illustrated in FIG. 11, when the learning unit 241 acquires the functional requirement description for learning (Step S11), the learning unit 241 inputs the functional requirement description targeted for vector generation to the vector generation unit 140. The vector generation unit 130 performs vector generation processing (Step S12) for generating the BoW vector for the input learning functional requirement description. This vector generation processing performs the same processing as that of Steps S1 to S8 illustrated in FIG. 4. Then, the learning unit 241 adds information indicating the necessity of verification associated with the functional requirement description for learning to the BoW vector generated by the vector generation unit 140 (Step S13).

Subsequently, the learning unit 241 determines whether the vector has been generated for all functional requirement descriptions for learning (Step S14). In a case where the learning unit 241 determines that the vector has not been generated for all functional requirement descriptions for learning (Step S14: No), the processing returns to Step S12, and the learning unit 241 executes the vector generation processing for the next functional requirement description targeted for vector generation.

On the other hand, in a case where the learning unit 241 determines that the vector has been generated for all functional requirement descriptions for learning (Step S14: Yes), the learning unit 241 performs the learning processing for learning, by machine learning, the generated BoW vector and the information relating to the necessity of verification associated with the training data (Step S15). The learning unit 241 stores the learning result in the storage unit 25, and ends the learning processing.

Processing Procedure of Prediction Processing

Figure 12:
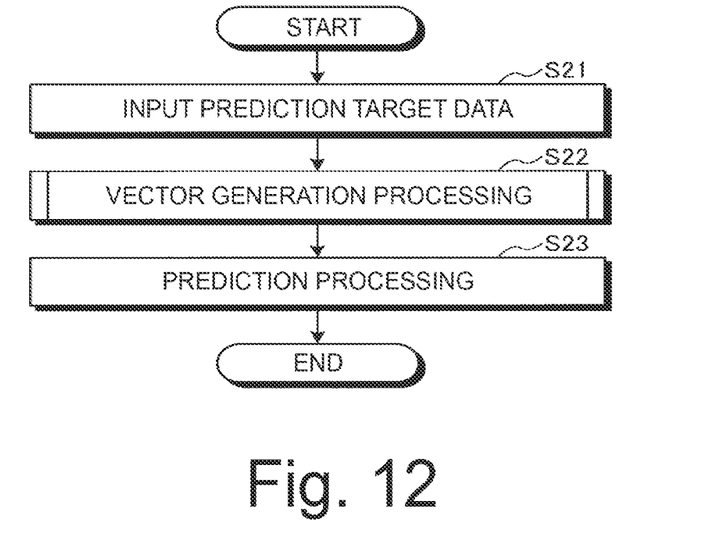
FIG. 12 is a flowchart illustrating a processing procedure of learning processing by a prediction unit illustrated in FIG. 6.

Next, a processing procedure of the prediction processing by the prediction unit 242 will be described. FIG. 12 is a flowchart illustrating the processing procedure of the learning processing by the prediction unit 242 illustrated in FIG. 6.

As illustrated in FIG. 12, the prediction unit 242 acquires the data targeted for prediction (the functional requirement description), and inputs the data to the vector generation unit 140 (Step S21). The vector generation unit 140 generates the BoW vector for this functional requirement description targeted for prediction (Step S22). This vector generation processing performs the same processing as that of Steps S1 to S8 illustrated in FIG. 4.

Then, the prediction unit 242 performs the prediction processing for predicting the necessity of verification for the prediction target data by using machine learning based on the generated BoW vector and the learning result from the learning unit 241 (Step S23).

Effects of Second Embodiment

As in the second embodiment, by applying the vector generation processing according to the first embodiment to learning of the necessity of verification of the functional requirement description and prediction of the necessity of verification of the functional requirement description, a person in charge of verification does not necessarily determine the necessity of verification for all functional requirement descriptions of the verification necessity table. Thus, according to the second embodiment, a processing burden on the person in charge of verification can be reduced, System Configuration and the Like The components of the devices illustrated are functionally conceptual and are not necessarily physically configured as illustrated in the drawings. That is, the specific forms of distribution and integration of the respective devices are not limited to those illustrated in the drawings, and all or some of the devices can be configured such that they are functionally or physically distributed or integrated in any units according to various loads, use conditions, or the like. Further, all or any part of the processing functions performed in the respective devices may be implemented by a CPU and a program to be analyzed and executed by the CPU or may be implemented as hardware by a wired logic.

Further, all or some of the processing operations described as being automatically performed, among the processes described in the present embodiment, can also be manually performed, or all or some of the processing operations described as being manually performed can also be automatically performed by a known method. In addition, information including the processing procedures, the control procedures, the specific names, and various types of data and parameters described in the above-described document and drawings can be optionally changed unless otherwise specified.

Program

Figure 13:
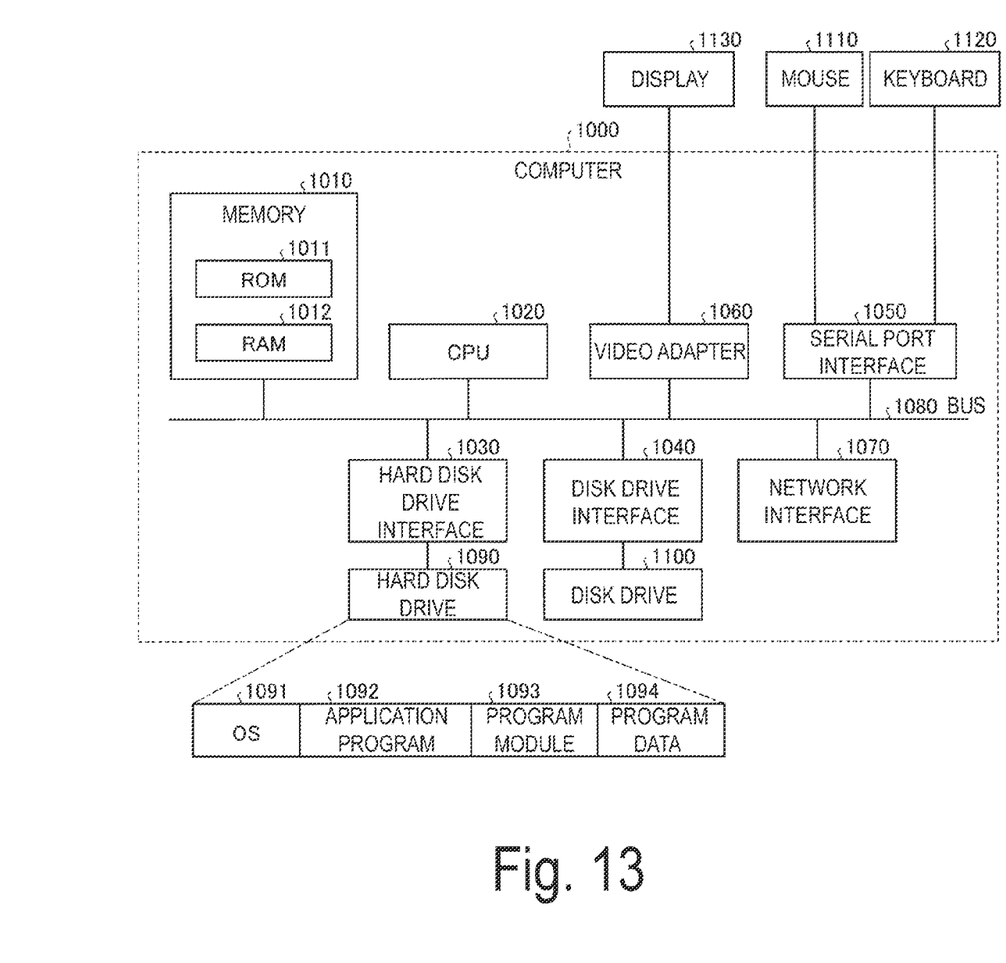
FIG. 13 is a diagram illustrating an example of a computer implementing a data processing apparatus by executing a program.

FIG. 13 is a diagram illustrating an example of a computer for implementing the data processing apparatus 10 by executing a program. A computer 1000 includes, for example, a memory 1010 and a CPU 1020. The computer 1000 includes a hard disk drive interface 1030, a disk drive interface 1040, a serial port interface 1050, a video adapter 1060, and a network interface 1070. These components are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A detachable storage medium such as a magnetic disk or an optical disc is inserted into the disk drive 1100. The serial port interface 1050 is connected, for example, to a mouse 1110 and a keyboard 1120. The video adapter 1060 is connected, for example, to a display 1130.

The hard disk drive 1090 stores, for example, an operating system (OS) 1091, an application program 1092, a program module 1093, and program data 1094. That is, a program defining each type of processing of the data processing apparatus 10 is implemented as the program module 1093 in which a computer-executable code is described. The program module 1093 is stored in, for example, the hard disk drive 1090. For example, the program module 1093 for executing processing similar to that of the functional configuration of the data processing apparatus 10 is stored in the hard disk drive 1090. Note that the hard disk drive 1090 may be replaced with a solid state drive (SSD).

Setting data used in the processing of the embodiments described above is stored as the program data 1094, for example, in the memory 1010 or the hard disk drive 1090. In addition, the CPU 1020 reads and executes the program module 1093 and the program data 1094 stored in the memory 1010 and the hard disk drive 1090 to the RAM 1012 as necessary.

Note that the program module 1093 and the program data 1094 are not limited to being stored in the hard disk drive 1090, and may be stored, for example, in a removable storage medium, and read by the CPU 1020 via the disk drive 1100 or the like. Alternatively, the program module 1093 and the program data 1094 may be stored in other computers connected via a network (a local area network (LAN), and a wide area network (WAN)). In addition, the program module 1093 and the program data 1094 may be read by the CPU 1020 from another computer through the network interface 1070.

Although embodiments to which the invention made by the inventor is applied have been described, the present invention is not limited by the description and the drawings that form a part of the disclosure of the present invention according to the present embodiments. That is, other embodiments, examples, operation techniques, and the like that those skilled in the art implement based on the present embodiments are all included in the scope of the present invention.

REFERENCE SIGNS LIST 10, 20 Data processing apparatus
11, 21 Input unit
12, 22 Output unit
13, 23 Communication unit
14, 24 Control unit
15, 25 Storage unit
140 Vector generation unit
141 Disassembly unit
142 Classifying unit
143 Word selection unit
144 Generation unit
151 Document data
152 Weight data
241 Learning unit
242 Prediction unit
251 Verification necessity table
252 Word count table
253 Learning result

The invention claimed is:

1. A data processing apparatus comprising:
a learning unit, including one or more processors, configured to:
select first words corresponding to a part-of-speech type targeted for selection from words disassembled from training data,
find, for each of the first words that are selected, a first value obtained by weighting the number of occurrences of each of the first words or frequency of occurrences of each of the first words according to the part-of-speech type of each of the first words to generate a first vector with a plurality of first values that are found as values of elements, and
learn the first vector that is generated and information relating to a necessity of verification associated with the training data; and
a prediction unit, including one or more processors, configured to:
select second words corresponding to the part-of-speech type targeted for selection from words disassembled from data targeted for prediction,
find, for each of the second words that are selected, a second value obtained by weighting the number of occurrences of each of the second words or frequency of occurrences of each of the second words according to the part-of-speech type of each of the second words to generate a second vector with a plurality of second values that are found as values of elements, and
predict a necessity of verification on the data targeted for prediction based on the second vector that is generated and a learning result from the learning unit.

2. The data processing apparatus according to claim 1, wherein the one or more processors are configured to select words corresponding to a plurality of part-of-speech types.

3. The data processing apparatus according to claim 1, wherein a noun alone and a noun compound word that combines a plurality of nouns are taken as different part-of-speech types.

4. A non-transitory computer readable medium storing one or more instructions causing a processor to execute:
selecting first words corresponding to a part-of-speech type targeted for selection from words disassembled from training data;
finding, for each of the selected words, a first value obtained by weighting the number of occurrences of each of the first words or frequency of occurrences of each of the first words according to the part-of-speech type of each of the first words to generate a first vector with a plurality of first values that are found as values of elements; and
learning the first vector that is generated and information relating to a necessity of verification associated with the training data;
select second words corresponding to the part-of-speech type targeted for selection from words disassembled from data targeted for prediction;
finding, for each of the second words that are selected, a second value obtained by weighting the number of occurrences of each of the second words or frequency of occurrences of each of the second words according to the part-of-speech type of each of the second words to generate a second vector with a plurality of second values that are found as values of elements; and
predicting a necessity of verification on the data targeted for prediction based on the second vector that is generated and a learning result.

5. The non-transitory computer readable medium according to claim 4, wherein the one or more instructions cause the processor to execute:
selecting words corresponding to a plurality of part-of-speech types.

6. The non-transitory computer readable medium according to claim 4, wherein a noun alone and a noun compound word that combines a plurality of nouns are taken as different part-of-speech types.

* * * * *